United States Patent [19]

Mansour et al.

[11] Patent Number: 5,510,092
[45] Date of Patent: Apr. 23, 1996

[54] INTEGRATED CATALYTIC/NON-CATALYTIC PROCESS FOR SELECTIVE REDUCTION OF NITROGEN OXIDES

[75] Inventors: Mansour N. Mansour, Irvine; Bruce C. Sudduth, Corona, both of Calif.

[73] Assignee: Applied Utility Systems, Inc., Irvine, Calif.

[21] Appl. No.: 333,501

[22] Filed: Nov. 1, 1994

[51] Int. Cl.$^6$ ............................................. C01B 21/00
[52] U.S. Cl. ................................. 423/239.1; 423/235
[58] Field of Search ............................. 423/239.1, 235

[56] References Cited

U.S. PATENT DOCUMENTS

5,233,934  8/1993  Krigmont et al. ............... 110/345

*Primary Examiner*—Michael Lewis
*Assistant Examiner*—Thomas G. Dunn, Jr.
*Attorney, Agent, or Firm*—William H. Drummond; Drummond & Duckworth

[57] ABSTRACT

In a combined SCR-SNCR process for reducing the NO content of a stream of combustion products by $NH_3$, SCR is employed for primary NO reduction. $NH_3$ is injected into the SNCR zone only when the NO content of the SCR effluent exceeds a preselected design maximum value.

3 Claims, 10 Drawing Sheets

FIG. 1

MAXIMUM ACHIEVABLE $NO_x$ REDUCTION PERCENTAGES AT VARIOUS GAS TEMPERATURES

FIG. 2

NH₃ UTILIZATION FACTOR vs. GAS TEMPERATURE AT MAXIMUM NO$_x$ REDUCTION

FIG. 3

OVERALL MOLAR RATIO FOR AN INTEGRATED
SNCR/SCR SYSTEM - LOW TEMPERATURE INJECTION

FIG. 4

OVERALL MOLAR RATIO FOR AN INTEGRATED
SNCR/SCR SYSTEM - HIGH TEMPERATURE INJECTION

FIG. 5

TYPICAL CHEMICAL UTILIZATION vs. NH$_3$ SLIP

FIG. 6

NOx REDUCTION vs. TEMPERATURE AND $H_2/NH_3$ RATIO

FIG. 7

NH3 SLIP vs. TEMPERATURE AND H2/NH3 RATIO

FIG. 8

H2/NH3 RATIO FOR MAXIMUM NOx REDUCTION
AT VARIOUS GAS TEMPERATURES

FIG. 9

NH₃ UTILIZATION FACTOR vs. TEMPERATURE AND H₂/NH₃ RATIO

FIG. 10

INTEGRATED CATALYTIC/NON-CATALYTIC PROCESS FOR SELECTIVE REDUCTION OF NITROGEN OXIDES

BACKGROUND OF THE INVENTION

This application relates to processes for reducing nitric oxide, NO, sometimes referred to as $NO_x$, in combustion zone effluent gas streams.

More particularly, the invention concerns a selective catalytic reduction ("SCR") process which, under limited circumstances, employs pretreatment of a combustion zone effluent gas stream by a selective non-catalytic reduction ("SNCR") process, i.e., only when the NO content of the SCR effluent exceeds a preselected maximum value.

In another respect the invention pertains to an integrated SCR-SCNR NO reduction process which minimizes the cost of chemical reducing agents.

Carbonaceous fuels can be made to burn more completely, with reduced emissions of carbon monoxide and unburned carbon and/or hydrocarbons, when the air/fuel ratio employed causes a high flame temperature. When fossil fuels are used in suspension fired boilers such as large utility boilers, flame temperatures above about 2000° F., to about 3000° F., are generated. Such high temperatures, as well as hot spots of higher temperatures, cause the production of thermal NO, the temperatures being so high that atomic oxygen and nitrogen are formed and chemically combine as nitrogen oxides. Nitrogen oxides, i.e., NO or $NO_2$ ("NO"), can also be formed as the result of oxidation of nitrogen-containing species in the fuel, such as those found in heavy fuel oil, municipal solid waste and coal. NO derived from nitrogenous compounds contained in the fuel can form even in circulating fluidized bed boilers which operate at temperatures that typically range from 1300° F. to 1700° F.

NO is a troublesome pollutant found in the combustion effluent stream of boilers and other combustion equipment. Nitrogen oxides contribute to tropospheric ozone, a known threat to health, and can undergo a process known as photochemical smog formation, through a series of reactions in the presence of sunlight and hydrocarbons. Moreover, NO is a significant contributor to acid rain, and has been implicated as contributing to the undesirable warming of the atmosphere, commonly referred to as the "greenhouse effect".

Recently, various processes for reducing NO in combustion effluents have been developed. They can generally be segregated into two categories: selective and non-selective. The selective processes include SCR and SNCR processes.

SCR processes involve passing the combustion zone effluent across or through a catalyst bed in the presence of $NH_3$, to achieve NO reductions as high as 50%–95% or higher. SNCR processes involve introducing NO reducing agents such as $NH_3$ into the effluent at higher temperatures than SCR processes, to achieve NO reductions of up to 50% or greater.

SCR processes for reducing NO are well known and utilize a variety of catalytic agents. For instance, in European Patent Application WO 210,292, Eichholtz and Weiler disclose the catalytic removal of nitrogen oxides using activated charcoal or activated coke, as a catalyst, with the addition of $NH_3$. Karo et al., in U.S. Pat. No. 4,138,469, and Henke in U.S. Pat. No. 4,393,031, disclose the catalytic reduction of NO with $NH_3$, using platinum group metals and/or other metals such as titanium, copper, molybdenum, vanadium, tungsten, or oxides thereof to achieve the desired catalytic reduction.

Another catalytic reduction process is disclosed by Canadian patent No. 1,100,292 to Knight, which discloses the use of a platinum group metal, gold, and/or silver catalyst deposited on a refractory oxide. Mori et al., in U.S. Pat. No. 4,107,272 disclose the catalytic reduction of NO using oxysulfur, sulfate, or sulfite compounds of vanadium, chromium, manganese, iron, copper, and nickel with the addition of $NH_3$ gas.

In a multi-phase catalytic system, Ginger, in U.S. Pat. No. 4,268,488, discloses treating a NO containing effluent to a first catalyst comprising a copper compound such as copper sulfate and a second catalyst comprising metal combinations such as sulfates of vanadium and iron or tungsten and iron on a carrier, in the presence of $NH_3$.

SNCR processes were also proposed to remove NO from combustion gas effluent streams by injecting $NH_3$ or an $NH_3$ precursor in the presence of oxygen, without using catalysts. For example, such processes are disclosed in U.S. Pat. No. 3,900,554 and in U.S. Pat. Nos. 4,777,024; 5,057,293; and 4,780,289.

In addition, combination SNCR-SCR processes have been proposed, such as the processes disclosed in U.S. Pat. Nos. 4,978,514; 5,139,764; 4,286,467; 4,302,431 and 5,233,934.

SUMMARY OF THE INVENTION

Prior combined SNCR-SCR processes sought to avoid handling $NH_3$ and/or sought to reduce catalyst costs, focusing on SNCR as the primary NO reduction stage. SCR was relegated to a secondary role, i.e., to remove other pollutants from the SNCR effluent and to minimize catalyst consumption.

However, we have determined that the use of SNCR as the primary stage for NO removal is not cost effective and results in substantially increased chemical consumption which more than offsets any savings from reduced catalyst consumption. Moreover, overfeeding the reducing chemicals to the SNCR stage to produce excess $NH_3$ in the feed to the SCR stage, as in certain prior processes, causes poor chemical utilization and severe $NO/NH_3$ stratification at the inlet to the SCR stage. This stratification greatly diminishes the effectiveness of SCR, with poor NO removal and high $NH_3$ breakthrough from the SCR stage.

We have now discovered that the overall economics of NO removal from combustion zone affluent gas streams can be significantly improved and the technical limitations caused by $NO/NH_3$ stratification can be significantly reduced by an improved integrated SCR/SNCR process. Our process is an improvement on prior combination SNCR/SCR processes. These prior processes included the steps of contacting the effluent gas stream in an SNCR zone with $NH_3$ to reduce part of the NO in the stream and then contacting the SNCR zone effluent in an SCR zone with $NH_3$ and a NO reduction catalyst, to further reduce the NO content of the gas stream. Our improvement in such prior combined SCR/SNCR processes comprises the steps of injecting $NH_3$ into the gas stream upstream of the SCR zone to provide a mixed gas/ammonia stream, providing sufficient catalyst in the SCR zone to reduce the NO content of the SCR zone effluent to a preselected maximum value at a design total NO throughput and at a design total gas stream throughput, and injecting $NH_3$ into the SNCR zone only when the NO content of the SCR effluent exceeds this preselected maximum value.

The amount of catalyst provided in the SCR zone is sufficient, at design total gas stream throughput and at design NO throughput, to provide the necessary contact time under the ambient reaction conditions to achieve a preselected maximum NO concentration in the SCR effluent at any condition of gas stream throughput and/or NO throughput up to these design maximum rates. When total gas stream throughputs or NO throughputs to the SCR stage which are above these design maxima, the NO content of the SCR effluent will rise above the preselected maximum, because the catalyst quantity is insufficient to accommodate throughputs above these maxima.

If the NO content of the SCR effluent exceeds the preselected maximum value, and only if this occurs, $NH_3$ is injected into the SNCR zone. $NH_3$ is injected into the SNCR zone at the minimum Normalized Stoichiometric Ratio mole ratio ("NSR") to reduce the NO throughput in the SCR zone to below the design maximum throughput. (As used herein, "NSR" means the actual $NH_3$:NO mole ratio in the SNCR stage divided by the stoichiometric $NH_3$:NO ratio in this stage.) This minimizes or entirely prevents $NH_3$ breakthrough from the SNCR zone.

Furthermore, $NH_3$ is injected into the SNCR stage at the optimum temperature for maximum overall $NH_3$ utilization. As will be explained below, there is an optimum temperature range for $NH_3$ injection into the SNCR stage which will maximize the overall $NH_3$ utilization of the combined SCR/SNCR process. In a preferred embodiment of the invention, hydrogen ($H_2$ is also injected into the SNCR stage and, optionally at the inlet to the SNCR stage, to broaden the optimum temperature range for $NH_3$ utilization in this stage.

In a further preferred embodiment of the invention, rapid mixing baffles are positioned in the gas stream upstream of the SNCR stages and the SCR stage, to further reduce the possibility of $NH_3$/NO stratification by turbulent mixing of the components of the SNCR effluent and turbulent mixing of the $NH_3$ and/or hydrogen injected into the SNCR effluent upstream of the SCR zone.

DESCRIPTION OF THE PREFERRED EMBODIMENTS

Figure 1:
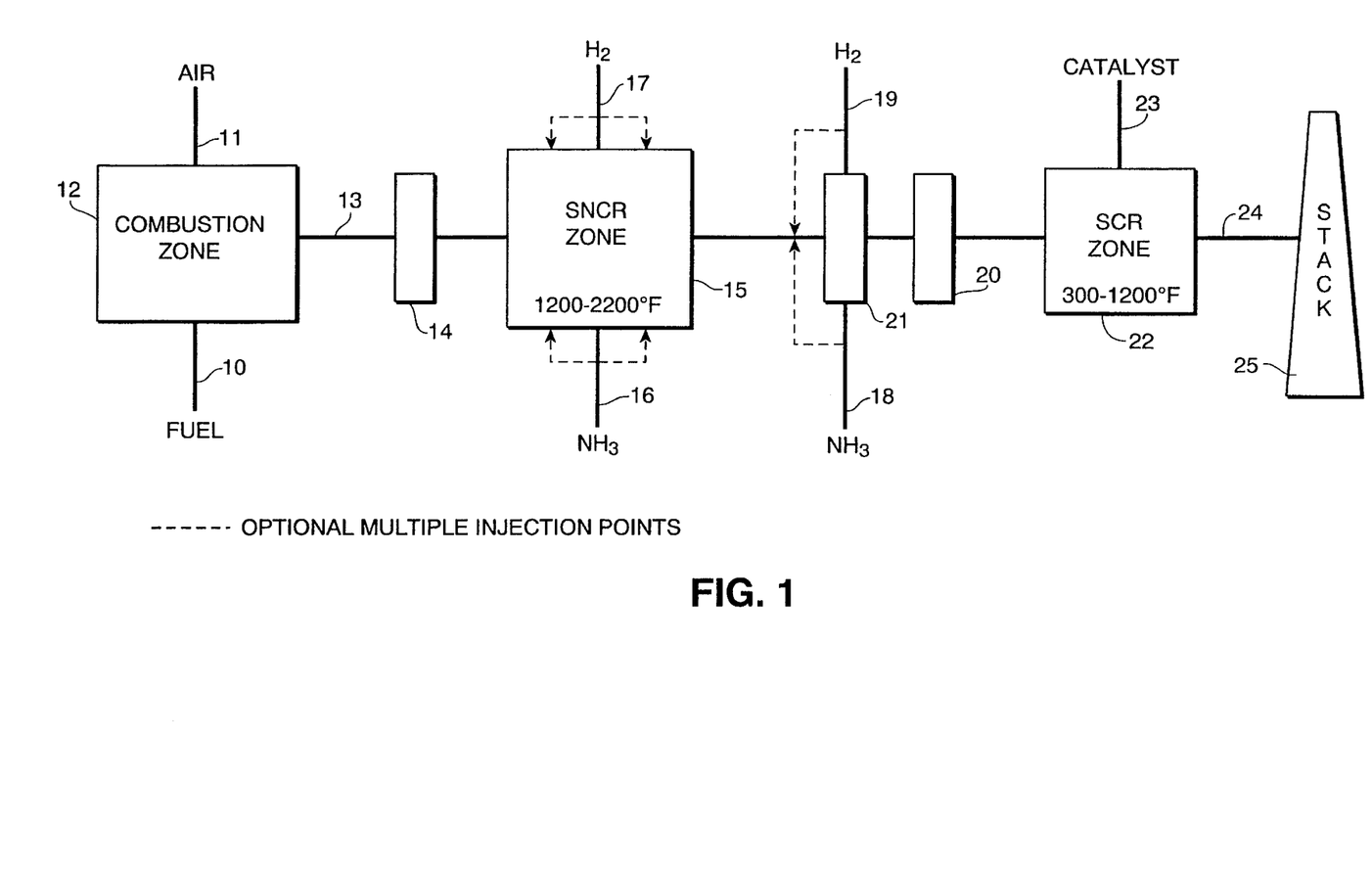
FIG. 1 shows a schematic depiction of a typical installation embodied by the present invention.

The principles and practice of the invention according to the best mode presently contemplated are further illustrated in the accompanying drawings. FIG. 1 is a flow sheet which schematically depicts a typical installation. A carbonaceous fuel 10 is mixed with air 11 and burned in a combustion zone 12. The fuel 10 is typically a fossil fuel which is burned to fire electric utility and industrial steam boilers. The fuel 10 may include coal, fuel oil or natural gas. In addition to utility and industrial boilers, the invention has application in controlling NO emissions from fluidized bed boilers, fuel fired petrochemical furnaces, cement kilns, glass melting furnaces, hazardous waste incinerators and even in methanation plants and landfill gas removal applications.

The high temperature effluent gases 13 from the combustion zone are, optionally passed through rapid mixing baffles 14 to increase the chemical and thermal homogeneity of the combustion zone effluent 13. At total gas stream and total NO throughputs which are below the design throughput of the system, the combustion zone effluent 13 passes through the SNCR zone 15 without injection of $NH_3$ 16 or hydrogen 17. When the gases have cooled to an appropriate temperature for SCR processing, $NH_3$ 18 and, optionally, hydrogen 19 are injected, preferably at or from the edges of the rapid mixing baffles 21, located just upstream of the SCR zone 22. The mixed combination SNCR zone effluent, $NH_3$ and hydrogen are contacted in the SCR zone 22 with the NO reduction catalyst 23. The SCR zone effluent 24, with NO content at or below the design maximum, is then vented to the atmosphere through stack 25.

As previously noted our process employs SCR as the primary stage for NO removal, because SCR provides essentially 100 percent utilization of injected $NH_3$ and, thus, offers the highest NO removal with the minimum chemical consumption. The temperature of the combustion gas at which contact with the catalyst is effected in the SCR stage will suitably range from about 300° F. to 1200° F.

Figure 2:
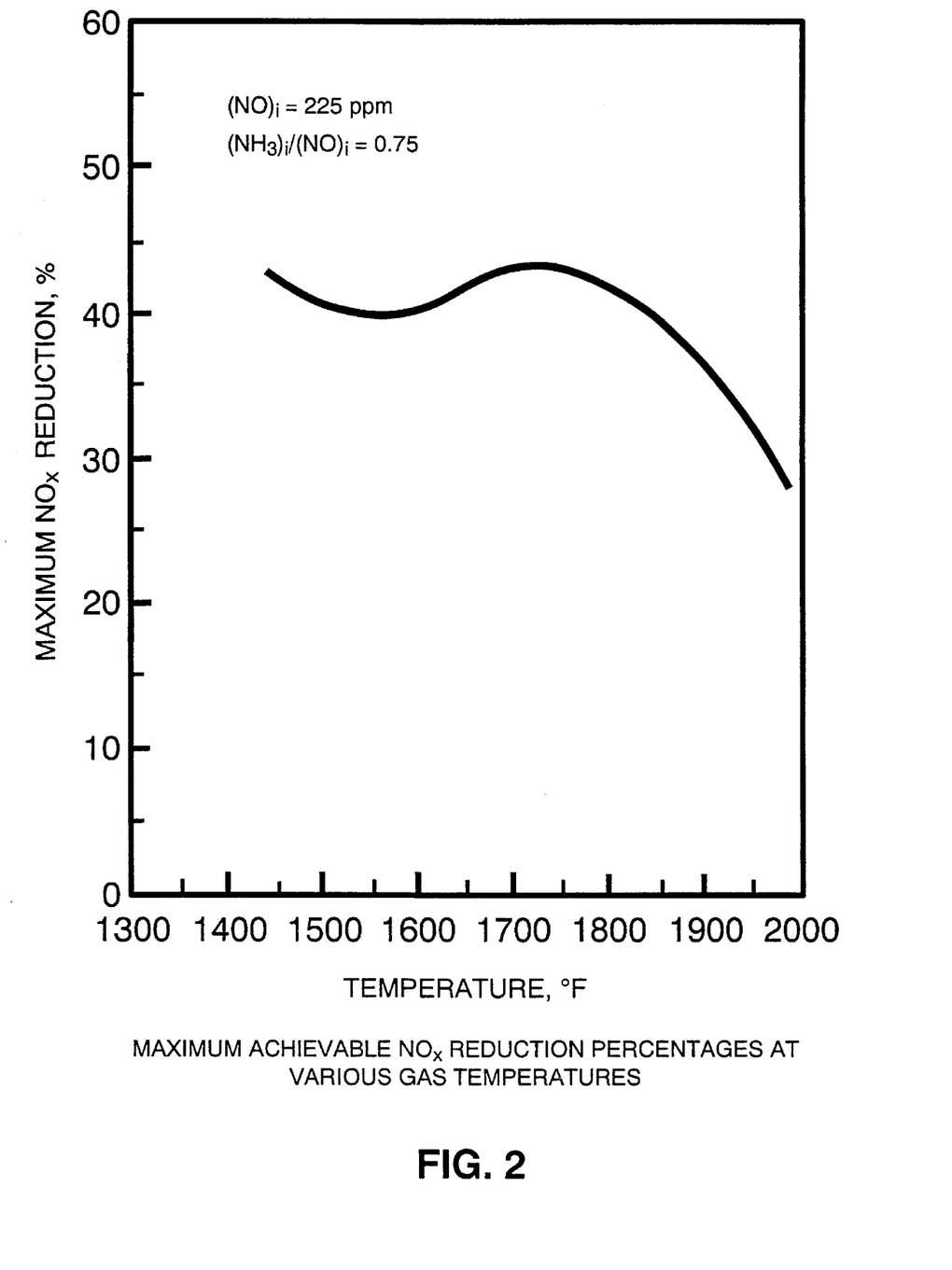
FIGS. 2 and 3 show the simultaneous NO removal and high $NH_3$ utilization in the SCNR stage.
Figure 3:
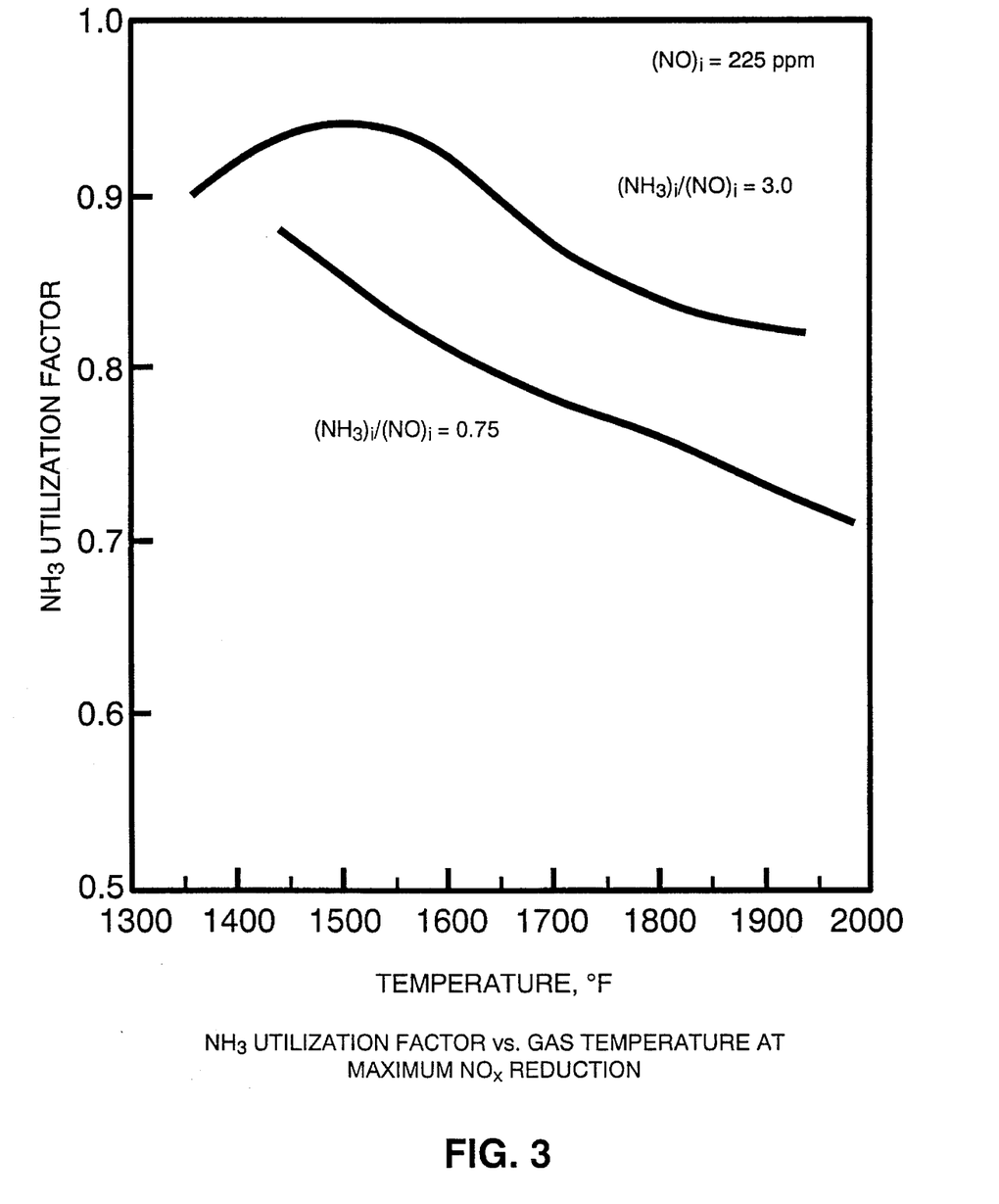

SNCR is only used when the maximum NO removal capability of the SCR stage is reached and exceeded. The combustion gas temperature at which $NH_3$ is injected in the SNCR stage will range between about 1200° F. and 2200° F. Chemical utilization is maximized in the SNCR stage by minimizing the NSR in this stage and by using hydrogen to expand the temperature window for the selective reduction of NO with $NH_3$. $H_2$ injection is used for achieving maximum NO removal and high $NH_3$ utilization in the SNCR stage at low NSR. By selecting the $H_2/NH_3$ mole ratio and the chemicals injection temperature high NO removal and high total $NH_3$ utilization can be simultaneously achieved in the SNCR stage as depicted in FIGS. 2 and 3. $H_2$ also functions to reduce $NH_3$ breakthrough from the SNCR stage.

In the preferred embodiment of this invention, rapid mixing baffles 14, 20, and 21 are used in the integrated system prior to the injection of chemicals, during the injection of chemicals, and after the injection of chemicals. The purpose of using the baffles 14 prior to the injection of chemicals 16, 17, 18, 19 is to ensure uniform temperature and gaseous species distribution, thus maximizing the NO reduction by the injected chemicals. Baffles 21 are used during the injection of chemicals to enhance chemical mixing with the flue gas. Baffles, 20, installed downstream of the injection of chemicals, further reduce temperature and chemical species stratification upstream of the SCR stage 22.

In a preferred embodiment of this invention, chemicals are injected in three locations within the integrated low NO system. The first and preferred location is upstream of the SCR system. $NH_3$ only is injected in this location. The sole purpose for the injection of $NH_3$ in this location is to effect the reduction of NO on the surface of the catalyst. The amount of $NH_3$ injected is increased to maintain a stack NO value and/or $NH_3$ breakthrough below a certain threshold.

$NH_3$ or $H_2/NH_3$ are injected in the SNCR Stage 2 only if the stack NO threshold is not achieved or stack $NH_3$ threshold is exceeded. It is expected that up to three discretely separate injection manifolds will be used. Each of these manifolds may inject $NH_3$ only, $H_2$ only, or a combination of the two chemicals. NSR would range from 0 to 2, and $H_2/NH_3$ mole ratio would range from 0 to 5.

In the preferred embodiment of this invention, the $NH_3$ injection would be staged, thus reducing the NSR ratio for each stage and improving chemical utilization. The amount and location of $H_2$ injection would depend on injection temperature and $NH_3/H_2$ mole ratio.

Prior processes used SNCR as the primary method for NO reduction. Certain of these processes increased the NSR in the SNCR stage and used $NH_3$ breakthrough from this stage to feed $NH_3$ to the SCR stage. It was disclosed that higher NSR in the SNCR stage increases the NO removal in this stage and the excess $NH_3$ was used to effect further reduction of NO in the SCR stage. However, experience does not demonstrate the economic attractiveness of this approach.

Figure 4:
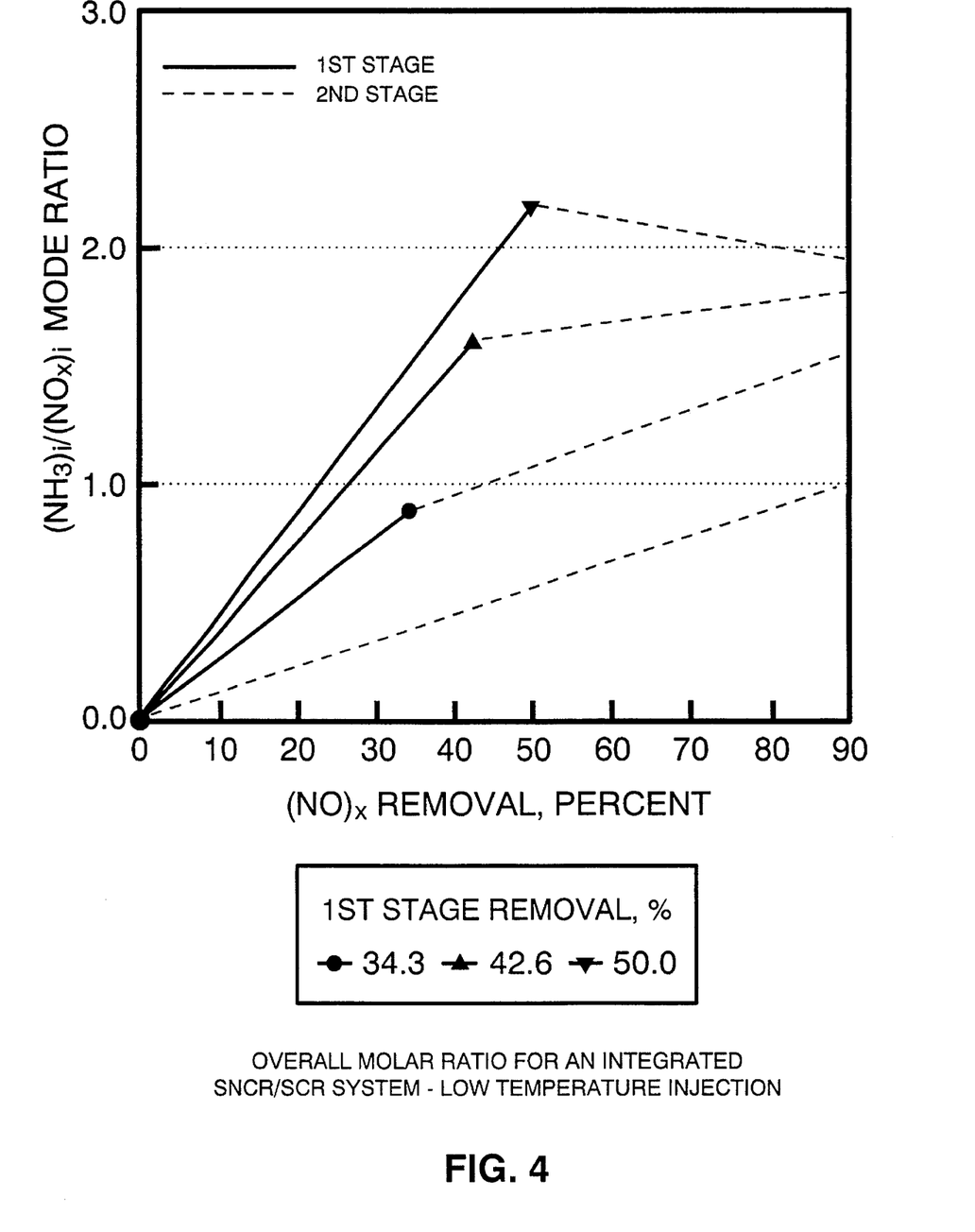
FIG. 4 shows the NO removal obtained at low temperature conditions.
Figure 5:
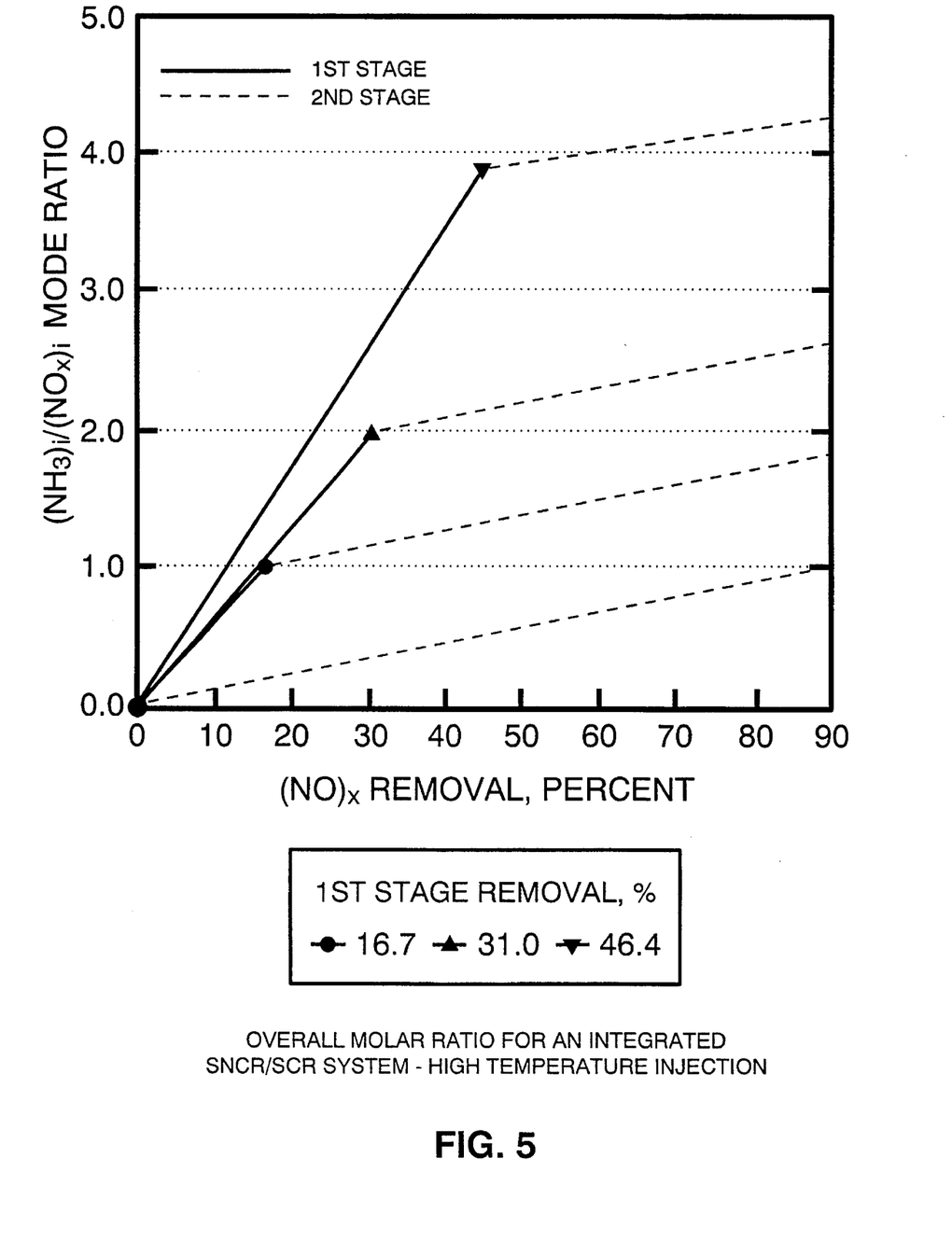
FIG. 5 shows the NO removal obtained at high temperature conditions.

The data in FIG. 4 are for low injection temperature conditions, and data in FIG. 5 are for high injection temperature conditions. The solid lines show the mole ratio and the corresponding NO removal obtained with the use of a nitrogenous reducing chemical in the SNCR stage. The dotted lines depict the overall mole ratio required to achieve a specific overall NO removal with an integrated SNCR/SCR system.

Thus, increasing the NO removal achieved in the SNCR stage increases the mole ratio required to achieve a specific overall integrated system NO removal. For an overall integrated system NO removal of 90 percent, the mole ratio is between two to four times the mole ratio for a stand alone SCR system.

The penalty in chemical consumption is less for low temperature injection conditions because of the reduced tendency for $NH_3$ oxidation at low temperatures, as shown in FIG. 4. Nevertheless, chemical consumption can still more than double that used in our integrated SCR/SNCR system, in which SCR is employed as the primary stage for NO removal.

Figure 6:
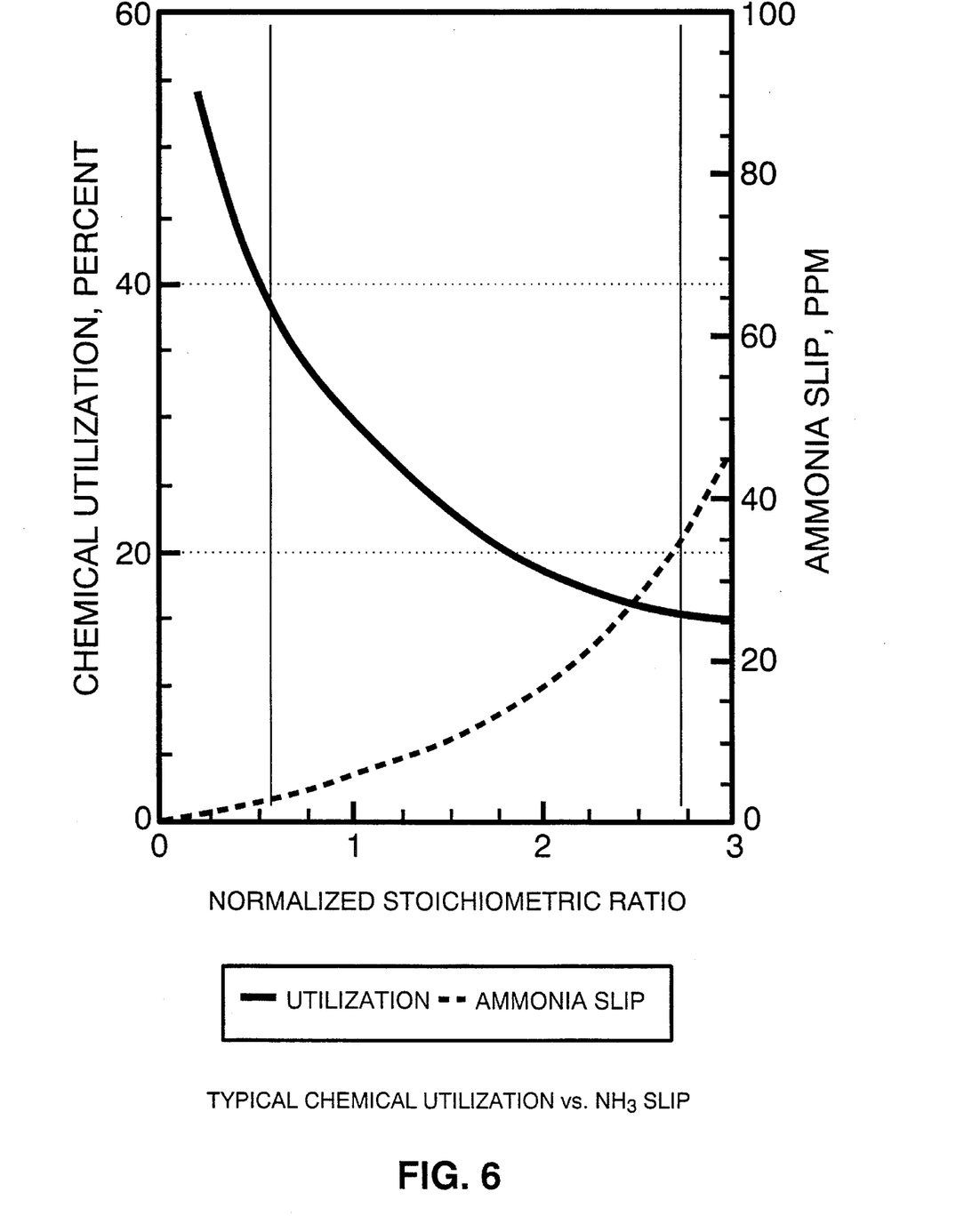
FIG. 6 illustrates $NH_3$ utilization and breakthrough in an SNCR stage.

Typical curves illustrating $NH_3$ utilization and breakthrough in an SNCR stage are depicted in FIG. 6. The data show that increasing the NSR reduces chemical utilization and increases $NH_3$ breakthrough. For this reason, in our process we limit the mole ratio in the SNCR stage to control $NH_3$ breakthrough to below 20 percent of the initial NO concentration at the inlet to the SNCR stage.

Reducing the mole ratio in the SNCR stage not only improves chemical utilization but to also reduces $NH_3$ concentration as well as $NH_3$-NO concentration stratification at the discharge of the SNCR stage.

Figure 7:
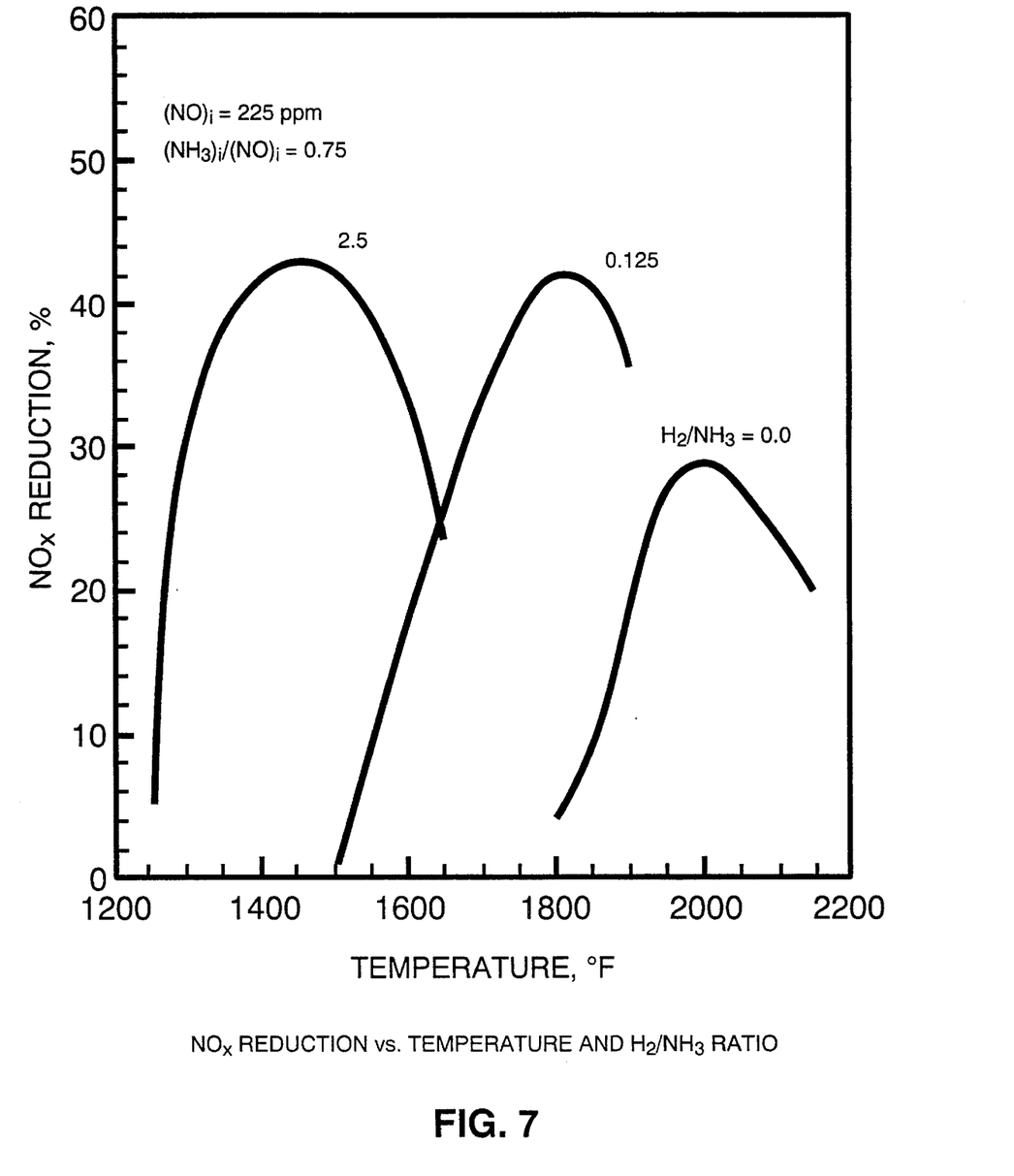
FIG. 7 depicts the change in NO reduction with temperature variation.

In addition to the NSR, chemical utilization in the SNCR stage is greatly influenced by reaction temperature. FIG. 7 depicts the change in NO reduction with temperature as generated by analytical modeling. As discussed above, the NO reduction/temperature relationship has the shape of a bell curve with maximum NO removal obtained at a specific temperature. Increasing or reducing the reaction temperature results in reducing the NO removal. The injection of $H_2$ with $NH_3$ reduces the optimum reaction temperature and the magnitude of this temperature reduction depends upon the amount of $H_2$ used. An increase in $H_2/NH_3$ mole ratio produces a larger reduction in optimum temperature as shown in FIG. 7.

Figure 8:
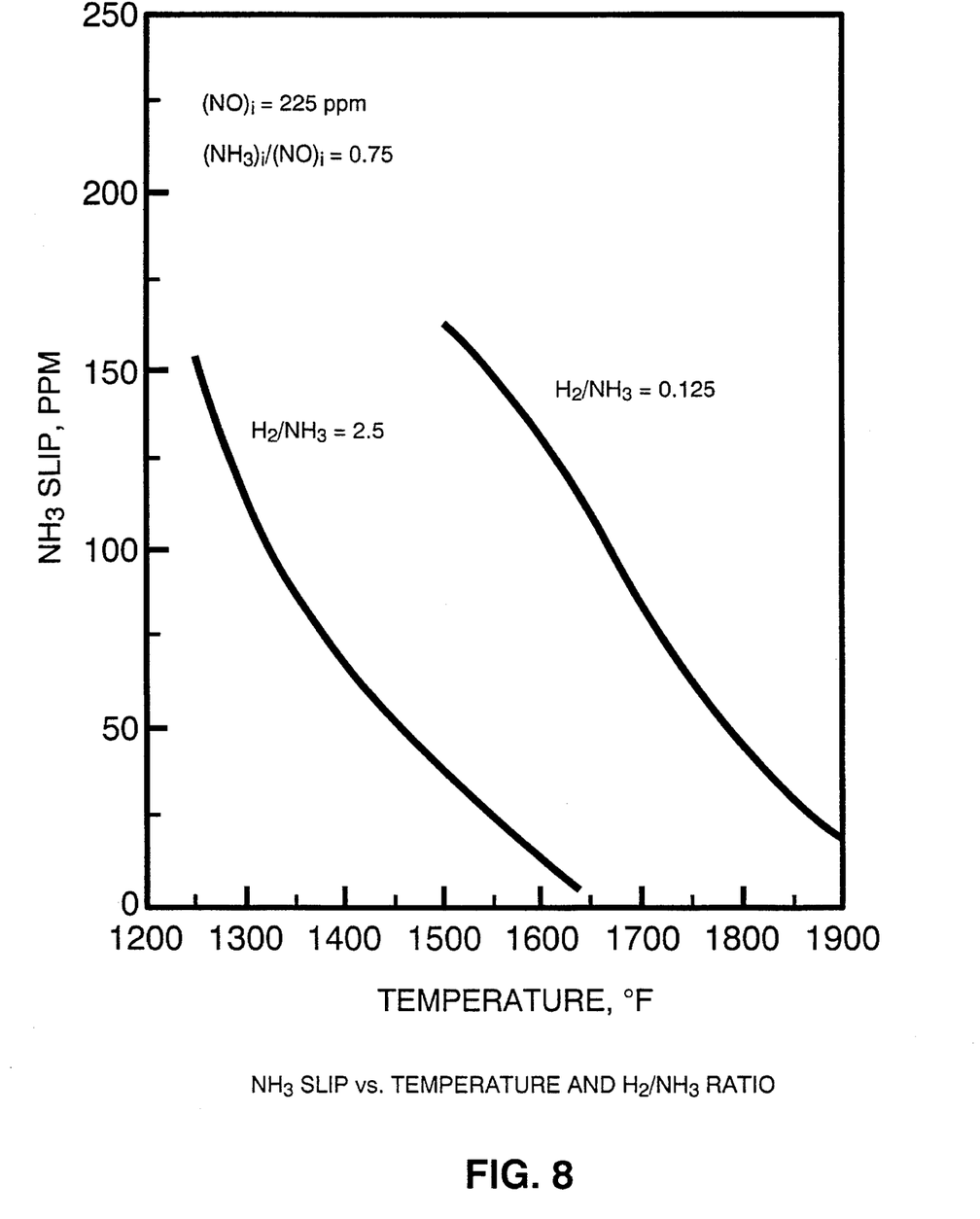
FIG. 8 shows the dependence of $NH_3$ breakthrough on temperature.

$NH_3$ breakthrough from the SNCR stage is also dependent upon reaction temperature. The dependence of $NH_3$ breakthrough on temperature is shown in FIG. 8. FIG. 8 shows that $NH_3$ breakthrough rapidly increases with a reduction in temperature. FIG. 8 shows that, for a given temperature, injection of $H_2$ with $NH_3$ reduces $NH_3$ breakthrough. For example, for a reaction temperature of 1500° F., increasing $H_2/NH_3$ mole ratio from 0.125 to 2.5 reduces $NH_3$ breakthrough from 150 ppm to 40 ppm. $H_2$ injection can thus be used to control $NH_3$ breakthrough as well as to improve $NH_3$ utilization in the SNCR stage.

Figure 9:
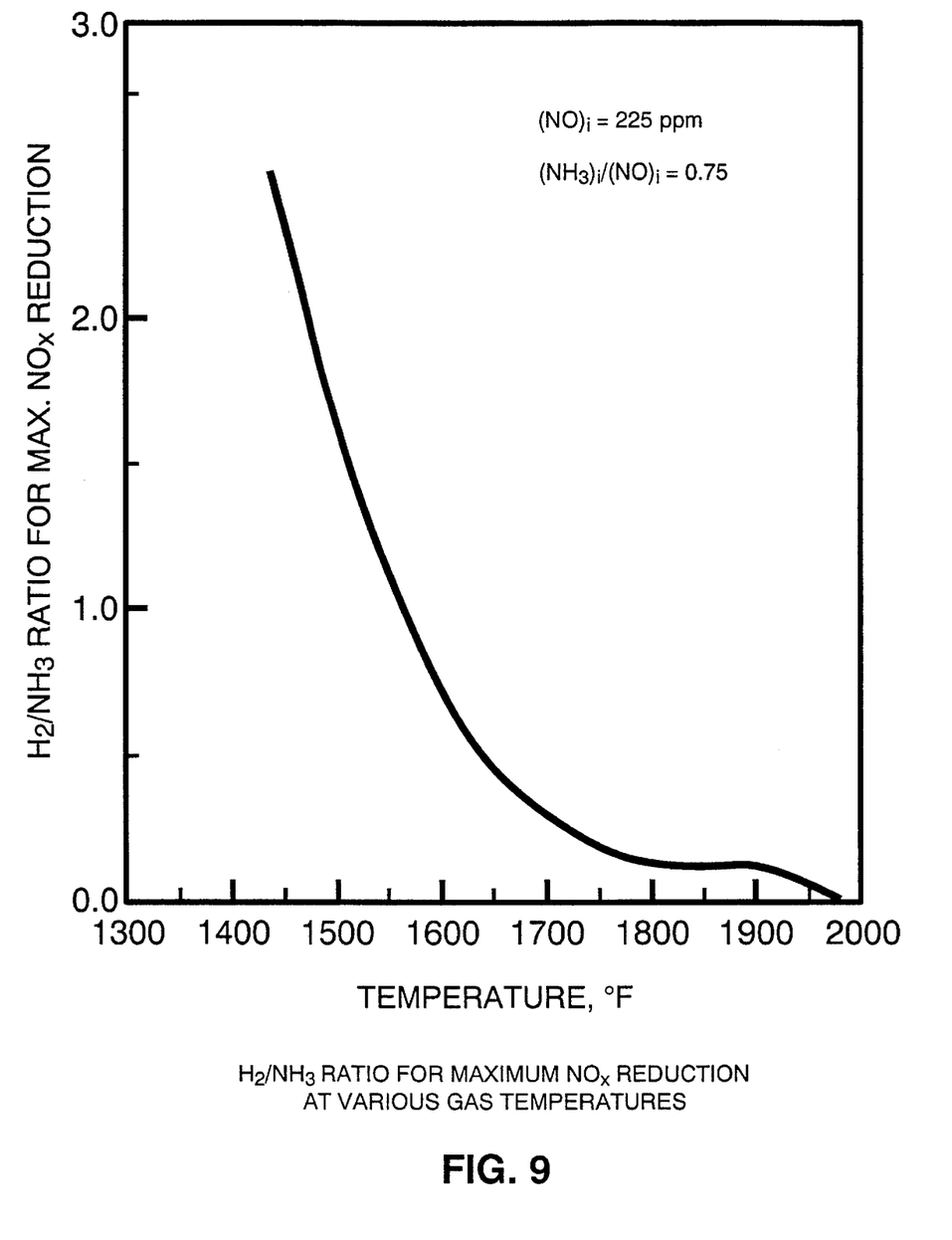
FIG. 9 shows the effects of the $H_2/NH_3$ ratio on the NO reduction as a function of temperature.

Maximum NO reduction as a function of temperature can be achieved by changing $H_2/NH_3$ mole ratio. These data, determined by analytical modeling, are depicted in FIG. 9. The data show that at temperatures between 1800° F. and 2000° F., little or no $H_2$ injection is needed. As the reaction temperature is reduced, $H_2$ requirements to maintain optimum NO reduction is increased.

Figure 10:
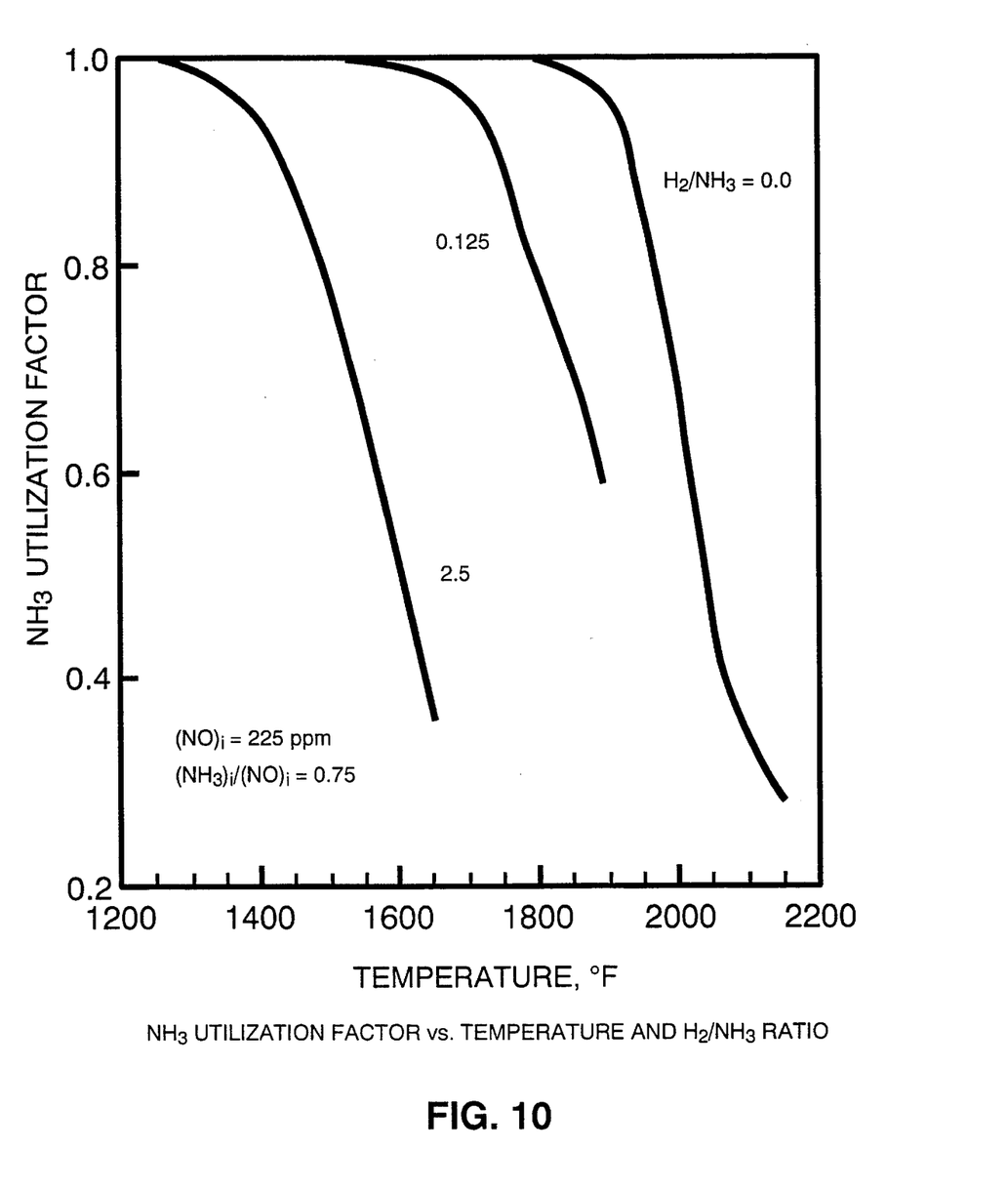
FIG. 10 shows the $NH_3$ utilization factor as a function of temperature.

As discussed above, our invention provides improved chemical utilization. This is achieved in the SNCR stage by reducing the NO removal requirement in this stage and, in turn, the required NSR. It is also achieved by improving total $NH_3$ utilization, i.e., the sum of $NH_3$ used for NO reduction and $NH_3$ breakthrough. In an integrated SCR/SNCR system, maximizing total $NH_3$ utilization will ultimately result in the maximum efficiency use of chemicals. $NH_3$ utilization factor as a function of temperature is presented in FIG. 10. FIG. 10. shows that, depending on $H_2/NH_3$ mole ratio, an optimum temperature can be defined to achieve 100 percent total $NH_3$ utilization. Such temperature, for example, is 1800° F. for $H_2/NH_3$ mole ratio of 0.0, and 1600° F. for $H_2/NH_3$ mole ratio of 0.125.

However, optimum temperature for maximum total $NH_3$ utilization does not produce the maximum NO removal in the SNCR stage. As shown in FIG. 7, injecting $NH_3$ at optimum temperature for maximum total $NH_3$ utilization results in less than one-third the NO removal achieved by injecting $NH_3$ at the optimum temperature for maximum NO removal.

Preferably, $H_2$ is injected to achieve maximum NO reduction in the SNCR stage at all temperature conditions. The use of $H_2$ maintains essentially a constant NO removal over a broad temperature range. The amount of $H_2$ used changes with temperature as shown in FIG. 9. $H_2$ injection is also used to maximize total $NH_3$ utilization. While maintaining maximum NO removal in the SNCR stage, the use of $H_2$ allows $NH_3$ utilization to range between 70 and 90 percent.

In addition to the chemical factors discussed above, the NO removal performance of integrated system is improved in our invention by reducing the stratification of temperature and chemical species concentration within the flue gas. Flue gas temperature stratification exists in a utility boiler application for a variety of reasons. Burners malfunction can result in extended flames and the creation of hot furnace regions in the convective section of the furnace. Heat transfer surface fouling can lead to non-uniform heat absorption profile resulting in temperature stratifications. Many boilers are designed with divided furnaces to bypass portions of the flue gas around the reheat and/or superheat sections of the boiler, allowing the control of steam temperature with minimal use of stream attemperation. The use of flue gas bypass results in temperature stratification at the discharge of the economizer or at the inlet to the SCR system. Temperature stratification in the SNCR stage influences $NH_3$ reduction of NO (FIG. 7). Localized high temperatures due to severe stratification can result in the oxidation of $NH_3$ to NO. Localized low temperatures result in high $NH_3$ breakthrough.

Like any other chemical reaction system, gaseous species stratification in a NO reduction system is detrimental. As discussed above, $NH_3$ utilization in the SNCR stage is greatly dependent upon NSR. The stratification of NO may result in "localized" high NSRs, leading to poor $NH_3$ utilization. Reaction time of $H_2$ with $NH_3$ is in the order of milli-seconds. For the injected $H_2$ to be fully utilized it is important that other gaseous species (NO and $NH_3$) are uniformly distributed.

Preferably, stratification is further minimized in the best mode of our system with the use of rapid mixing baffles, e.g., the "delta wings" developed by Balcke-Dürr of Germany and others for a broad range of flue gas mixing applications. The rapid mixing baffles are positioned in the flow path of the flue gas. The size and shape of the baffles and their orientation with respect to the flue gas flow direction are selected to induce a large downstream recirculation field. The recirculation enhances gas mixing, thus reducing or almost totally eliminating temperature or gaseous species stratification.

In the best mode of our system, the baffles are installed upstream of the $NH_3$ and $H_2$ injection location to ensure uniformity of flue gas temperature and gaseous species distribution. Preferably, the rapid mixing baffles are also used for the injection of chemicals. The injection of chemicals downstream of the baffles thus provides for mixing the chemicals with the flue gas. Finally, the baffles are used to mix the flue gas downstream of the SNCR stage to reduce or substantially eliminate temperature and chemical species stratification at the inlet to the SCR stage.

In the preferred practice of our invention, the $NH_3$ is injected into the SNCR zone at multiple discretely separate injection locations to reduce the NSR for each injection location and improve chemical utilization. In the best mode of our invention there are at least two of these discrete separate injection locations. Likewise, hydrogen is injected into the SNCR zone at multiple discretely separate injection locations. This expands the temperature range for ammonia $NH_3$ reduction of NO, improves overall chemical utilization and reduces $NH_3$ breakthrough from the SNCR stage. The $NH_3$ and hydrogen can be injected separately into the SNCR stage or as mixtures in each injection location.

Thus, according to the preferred practice of our invention, the NSR in the SNCR stage ranges between 0 and 2 and the $H_2$:$NH_3$ mole ratio in the SNCR stage ranges between 0 and 5. Under these conditions $NH_3$ breakthrough from the SNCR zone is maintained at or below 20 percent of the inlet NO concentration of the gases entering the SNCR stage. The $NH_3$:NO mole ratio of the process is selected to maintain $NH_3$ in the effluent from the SCR stage below 20 ppm.

Having described our invention in such terms as to enable those skilled in the art to understand and practice it and, having described the presently preferred embodiments and best modes thereof, we claim, 1. In a combined SCR-SNCR process for reducing the NO content of a gas stream effluent from a combustion system, said effluent containing combustion products, including NO, said process including contacting said gas stream in an SNCR zone with $NH_3$ to reduce part of the NO in said stream, and contacting the SNCR zone effluent in an SCR zone with $NH_3$ and a NO reduction catalysts to further reduce the NO content of said gas streams, the improvement comprising:

(a) injecting $NH_3$ into said gas stream downstream of said SNCR zone and upstream of said SCR zone to provide a mixed gas-ammonia stream, the quantity of $NH_3$ injected being just sufficient to effect the NO reduction in the SCR zone;

(b) providing sufficient catalyst in said SCR zone to reduce the NO content of the SCR zone effluent to a maximum value;

(c) passing said gas stream with an amount of NO that exceeds said maximum value to said SCR zone; and (d) injecting $NH_3$ into said SNCR zone only when the NO content of the SCR zone effluent exceeds said maximum value.

2. The process according to claim 1 wherein the temperature of the combustion gas at which contact with the catalyst is effected in the SCR zone is from about 300° F. to 1200° F. and the combustion gas temperature at which $NH_3$ is injected in the SNCR zone is from about 1200° F. to 2200° F.

3. The process according to claim 1 wherein the catalyst in the SCR zone is selected from the group consisting of platinum group metals, titanium, copper, molybdenum, vanadium, tungsten, and oxides thereof.

* * * * *